US012080983B2

(12) United States Patent
Prabhakar et al.

(10) Patent No.: US 12,080,983 B2
(45) Date of Patent: Sep. 3, 2024

(54) APPARATUS FOR AUTOMATED LOOP CHECKING

(71) Applicant: Honeywell International Inc., Charlotte, NC (US)

(72) Inventors: Varun Prabhakar, Bangalore (IN); Rahul De, Bangalore (IN); Karma Bhutia, Bangalore (IN); Ananda H, Bangalore (IN); Rahul Didwani, Bangalore (IN); Vishwanath Balakrishna, Bangalore (IN); Dawa Pakimo, Bangalore (IN)

(73) Assignee: UOP LLC, Des Plains, IL (US)

( * ) Notice: Subject to any disclaimer, the term of this patent is extended or adjusted under 35 U.S.C. 154(b) by 440 days.

(21) Appl. No.: 17/024,480

(22) Filed: Sep. 17, 2020

(65) Prior Publication Data
US 2021/0098905 A1  Apr. 1, 2021

(30) Foreign Application Priority Data

Sep. 26, 2019  (IN) .............................. 201911039022

(51) Int. Cl.
*H01R 9/24* (2006.01)
*G06F 9/30* (2018.01)
*G06F 9/46* (2006.01)

(52) U.S. Cl.
CPC ....... *H01R 9/2491* (2013.01); *G06F 9/30065* (2013.01); *G06F 9/463* (2013.01)

(58) Field of Classification Search
CPC .... G06F 9/30065; G06F 9/463; H01R 9/2491
USPC ......................................................... 439/709
See application file for complete search history.

(56) References Cited

U.S. PATENT DOCUMENTS

| | | | |
|---|---|---|---|
| 6,033,257 A | 3/2000 | Lake et al. | |
| 9,411,769 B2 * | 8/2016 | Emi ..................... | G05B 19/042 |
| 9,799,610 B2 | 10/2017 | Xu et al. | |
| 10,261,486 B2 * | 4/2019 | Bodmann .......... | G05B 19/0423 |
| 10,379,527 B2 * | 8/2019 | Jundt ..................... | H04L 67/12 |
| 10,867,504 B2 * | 12/2020 | Virkler .................. | G08B 21/18 |
| 11,126,148 B2 * | 9/2021 | Findlay ................ | H05K 7/1484 |

FOREIGN PATENT DOCUMENTS

WO     2017066304 A1    4/2017

OTHER PUBLICATIONS

Hernandez., "Pros & Cons of Electronic Marshalling for a Safety System", 2016, Texas A&M, 7 pages. (Year: 2016).*
Emerson: "Product Data Sheet DeltaV SIS Process Safety System", Oct. 1, 2017 (Oct. 1, 2017), pp. 1-30, XP055776649.

* cited by examiner

*Primary Examiner* — Ted T. Vo
(74) *Attorney, Agent, or Firm* — James C. Paschall; Paschall & Associates, LLC

(57) ABSTRACT

An apparatus is configured to be installed on a terminal block to make an electrical connection to at least one I/O loop. The apparatus includes a terminal section having at least one pair of electrical terminals. The electrical terminals are arranged to be connected to the terminal block and to the I/O loop. The apparatus further includes an electronic section electrically connected to the terminal section adapted to communicate with the I/O loop through the terminal section.

17 Claims, 6 Drawing Sheets

APPARATUS FOR AUTOMATED LOOP CHECKING

CROSS-REFERENCE TO RELATED APPLICATION

This application claims priority under 35 U.S.C. § 119(b) to India Provisional Patent Application No. 201911039022, filed on Sep. 26, 2019. This provisional application is hereby incorporated by reference in its entirety.

TECHNICAL FIELD

This disclosure is generally directed to industrial process control and automation systems. More specifically, this disclosure is directed to an apparatus for the automated checking of I/O loops.

BACKGROUND

Loop checking is the process of validating and verifying the accuracy of cables that are laid from control panels to field instruments, which ensures that the right transmitter is connect to the correct Input/Output (I/O) port of a controller. Loop checking is an important activity in a plant during installation, commissioning and maintenance phases. In many plants, loop checking is a mandatory activity that cannot be eliminated and consumes large amounts of time, cost and manpower. Loop checking requires multiple people working together to ensure that the loop is properly connected to I/O ports and a marshalling cabinet. Loop checking needs to be completed before powering up of a field instrument or marshalling cabinet.

Process Industries like oil & gas, petrochemicals, refineries etc. involves multiple stages of validation and verification in the project lifecycle. Validation and verification of input/output (I/O) loop checks need to be completed before starting the commissioning and startup of the plant. During a projects lifecycle, the validation of I/O loop check activities occur at PRE-FAT (pre-factory acceptance testing), FAT (factory acceptance test) and SAT (site acceptance test) and validate the hardwired I/O loop from the junctions boxes, field termination assemblies and marshalling cabinets to field instruments. This is manually intensive, repetitive & time-consuming activity is required to demonstrate that the correct wiring and configuration has been made for each I/O channel.

When the cables are checked for failures, the cables between junction boxes, field termination assemblies are tested by detecting a signal transmitted from a control panel to specific field devices. Currently, each cable is manually tested by a group of people from a cable source (such as a marshalling cabinet) to a destination (such as a field transmitter), which is time consuming.

SUMMARY

This disclosure provides an apparatus for the automated checking of I/O loops of an industrial process control and automation system.

In a first embodiment an apparatus is provided. The apparatus is configured to be installed on a terminal block to make an electrical connection to at least one I/O loop. The apparatus includes a terminal section having an electrical connector and at least one pair of electrical terminals. The electrical terminals are arranged to be connected to the terminal block and to the I/O loop. The apparatus further includes an electronic section having an electrical connector connected to the terminal section connector arranged to communicate with the I/O loop through the terminal section. A latching arm on the apparatus is configured to be manually operated to retain the apparatus to the terminal block.

In a second embodiment an apparatus is provided. The apparatus is configured to be installed on a terminal block and to make an electrical connection to at least one I/O loop. The apparatus includes a terminal section having an electrical connector and at least one pair of electrical terminals. The electrical terminals arranged to be connected to the terminal block and to the I/O loop. The apparatus further includes an electronic section having an electrical connector connected to the terminal section connector arranged to communicate with the I/O loop through the terminal section. In addition, a latch is provided configured to be manually operated to retain the terminal section to the electronic section.

In a third embodiment an apparatus is provided configured to be installed on a terminal block to make an electrical connection to at least one I/O loop. The apparatus includes a terminal section having at least one pair of electrical terminals. The electrical terminals are arranged to be connected to the terminal block and to the I/O loop. The apparatus further includes an electronic section electrically connected to the terminal section adapted to communicate with the I/O loop through the terminal section. The terminal section further adapted to be connectable to at least one other terminal section forming a stackable modular terminal unit.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
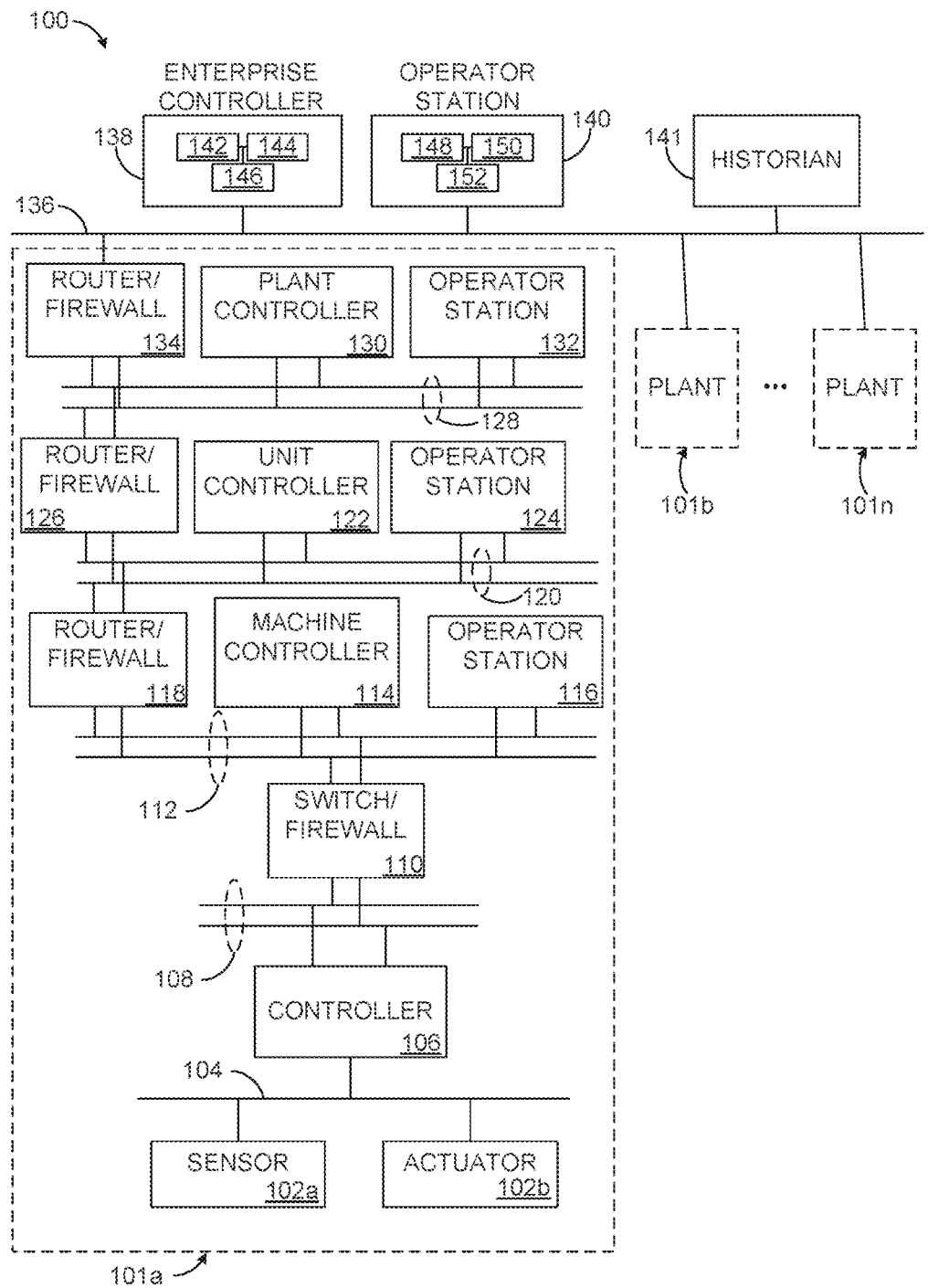
FIG. 1 illustrates an example industrial control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS (FF) network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In accordance with this disclosure, various components of the system 100 support a process for an automated loop check in the system 100. For example, the controllers 104a-104b may represent field device controllers, and the process elements 102a-102b may represent field devices. Additional details regarding this functionality are provided below.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

Figure 2:
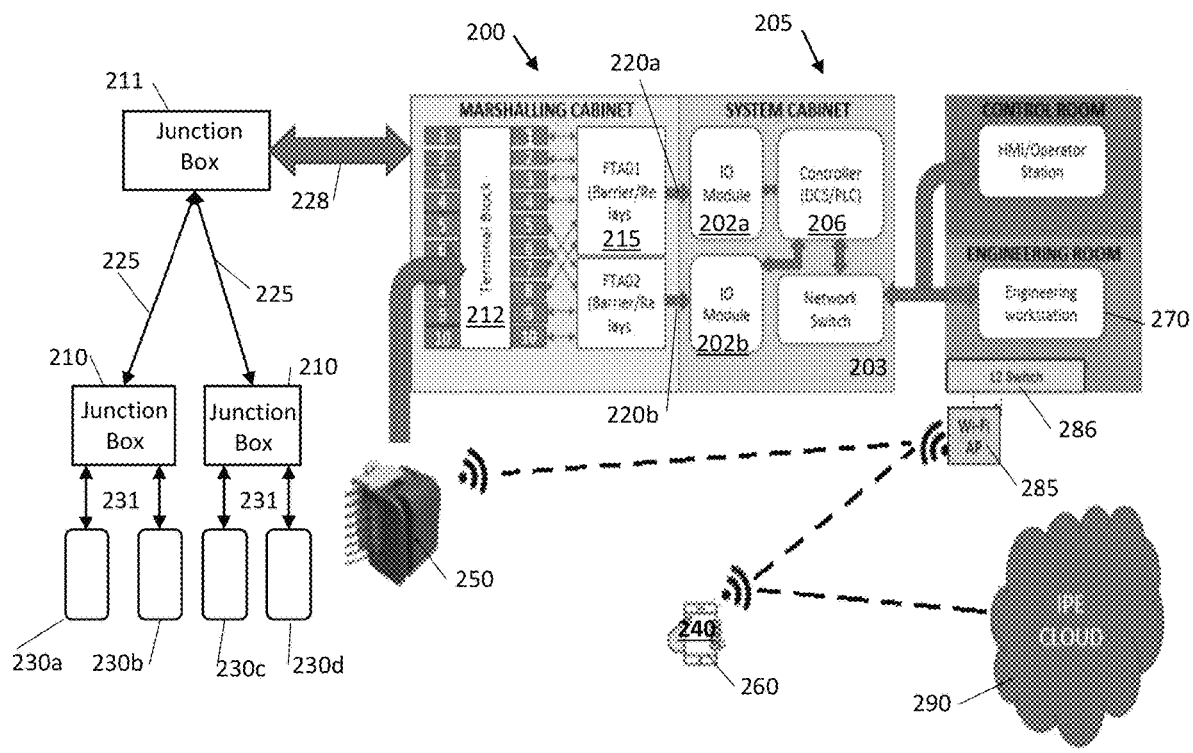
FIG. 2 illustrates an example system for the automated checking of I/O loops according to this disclosure.

FIG. 2 illustrates an example the marshalling cabinet 200 according to this disclosure. For ease of explanation, the marshalling cabinet 200 is described as being used in the system 100 of FIG. 1. For example, the marshalling cabinet 200 may be located between a system cabinet 205 housing controllers 106, and process elements 102a and 102b, and other hardware such as switch/firewall 110, or a combination of the components described in FIG. 1. However, the marshalling cabinet 200 could also be used in any other suitable system.

The marshalling cabinet 200 includes field termination block 212 and field termination relay hardware 215. Only one field termination block 212 is shown in FIG. 2 for ease of illustration, however, it is well known to those skilled in this art, that marshalling cabinets may containing a plurality of terminal blocks 212 housed in cabinet 200. The field termination block 212 connects wire cables between cabinet 200 and process elements, such as actuators, sensors and other process instruments installed in the automation system. The system cabinet 205 connects to the marshaling cabinet 200 via the field termination relay hardware 215 and wiring cables 220a and 220b. The marshalling cabinet 200, further connects to a plurality of junction boxes 210, and to a plurality of process instruments 230a-230d.

The marshalling cabinet 200 receives signals transmitted from one of the process instruments 230a-230d through a junction boxes 210 and cable bundles 225. Each process instrument 230a-230d is coupled to a respective junction box 210 via a cable 231. The cables 231 are bundled at the junction boxes 210 to form a cable bundle 225 upstream of the junction box 210. A junction box 211 can also be used to combine multiple cable bundles 225 into a single cable bundle 228, as illustrated between the junction box 211 and the marshalling cabinet 200.

Although FIG. 2 illustrates one example of a junction box 210, 211, various changes may be made to FIG. 2. For example, the number(s) and type(s) of components shown in FIG. 2 and the functional divisions of the junction boxes 210, 211, marshaling cabinet 200, system cabinet 205 and their included hardware shown in FIG. 2 are for illustration only Various components in FIG. 2 could be omitted, combined, or further subdivided and additional components could be added according to particular needs.

The automated loop check system of the disclosure employees an intelligent apparatus in the form of a dongle 250 arranged to connect to the terminal blocks of cabinet 200 such as terminal block 212 and simulate signals based on input/output information provided to the dongle 250 from operating software 240 operating in a remotely located mobile hand-held device 260. The dongle 250 can also be installed to terminal blocks in the junction boxes 210 in the same manner as will be explained for the terminal block 212 of the marshalling cabinet 200.

Operating software 240 is installed on the hand-held mobile device 260 operated in a remote location. The mobile device may be any wireless device for example, such as a cellular telephone, data pad, tablet, or hand-held portable computer operating on an IOS an ANDROID or WINDOWS operating system. The operating software 240 controls the sequencing of execution of tests through dongle 250 based on personality information of each process instrument connected to the terminal block 212. The operating software 240 automatically generates an I/O loop check file using predefined library functions based on project engineering database input. The I/O loop check file is downloaded to dongle 250 for execution and testing of the I/O loops connected to the dongle 250.

The hand-held device 260 is connected via a wireless WI-FI or BLUETOOTH connection to the dongle 250. Additionally, the hand-held device 250 is further connected via a wireless WI-FI connection to an engineering workstation 270, as well as to the cloud 290 through WAP 285 mounted on L2 switch 286 as shown in FIG. 2. The cloud connections are through integrity policy enforcement (IPE) security that hosts a smart plant instrumentation (SPI) database that among other functions within an industrial process control and automation system design, defines the overall wiring connections between the sensors, actuators, controllers servers, operator stations, and networks of the industrial process control and automation system.

Figure 3:
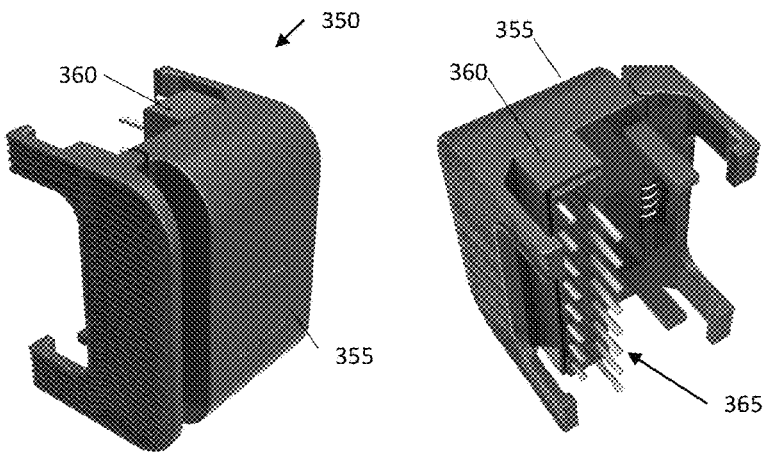
FIG. 3 is an example perspective view of a first embodiment of the apparatus according to this disclosure.
Figure 5:
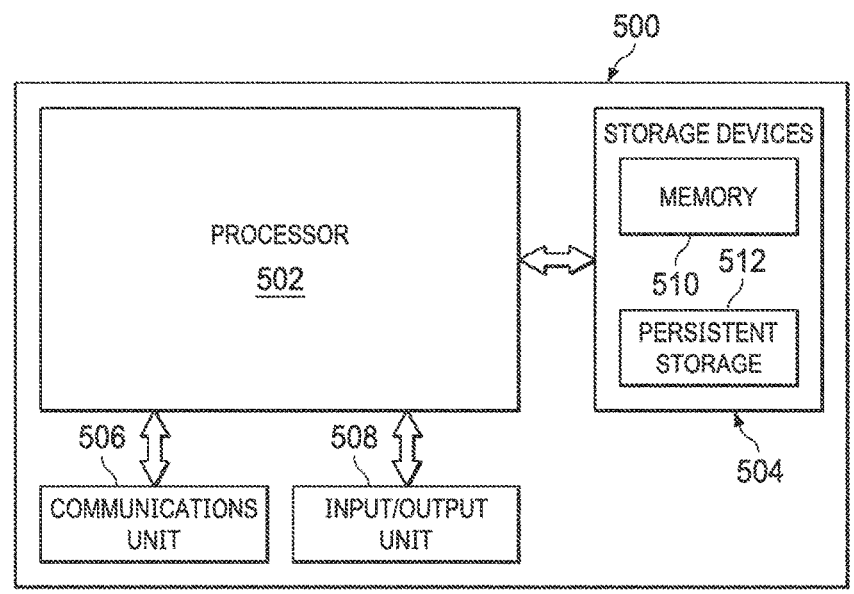
FIG. 5 illustrates an example of the electronics section according to this disclosure.

Turning know to FIG. 3, a first embodiment of the apparatus of the disclosure is illustrated. Dongle 350 is comprised of an electronics section 355 and a separate terminal section 360. The electronics section 355 of dongle 350 is shown schematically at FIG. 5. The electronics section 500 includes at least one processor 502, at least one storage device 504, at least one communications unit 506, and at least one input/output (I/O) unit 508. Processor 502 can execute instructions, such as those that may be loaded into memory 504. Processor 502 denotes any suitable processing device, such as one or more microprocessors, microcontrollers, digital signal processors, application specific integrated circuits (ASICs), field programmable gate arrays (FPGAs), or discrete circuitry.

The memory 510 and a persistent storage 512 are examples of storage devices, which represent any structure(s) capable of storing and facilitating retrieval of information (such as data, program code, and/or other suitable information on a temporary or permanent basis). The memory 510 may represent a RAM or any other suitable volatile or non-volatile storage device(s). The persistent storage 512 may contain one or more components or devices supporting longer-term storage of data, such as a ROM, and flash memory, or the like. Memory 510 can be used to store for example, the intermediate results of the operation of the processor 502 and the test files to be executed by dongle 350 as well as the results of the executed loop tests. The persistent storage may be used, for example, for storing the processor operating system, and the software for performing self-testing and calibration of the dongle 350.

The communications unit 506 supports communications with other systems or devices. For example, the communications unit 506 could include at least one network interface facilitating communications over a wireless communication protocol such as WI-FI or BLUETOOTH.

The I/O unit 508 allows for the input and output of data and is electrically connected through a connector (not shown) to the terminal section 360 of dongle 350. For example, the I/O unit 408 may provide a connection through the terminal section 360 for providing simulated I/O commands to a process instrument. The I/O unit 408 supports 8 channels of any I/O Type with functional 5-point analog test support. The I/O unit 408 drives signals to the I/O loops under test via the 8-channel terminal section 360 through the terminal block 212. The I/O unit 508 supports I/O configurations downloaded from the I/O loop operating software 240 such as analog input (AI), digital input (DI), digital output (DO), Analog Output (AO), Thermocouple/RTD, Low Level Multiplexing/Low Level analog input End of Line (LLMux/LLAI EOL) monitoring (Short/Open) and burnout detection.

Return to FIG. 3, the terminal section 360 provides a snap-in arrangement of terminal pins 365. For example, in the terminal section 360 shown in FIG. 3, an 8-channel snap-in terminal section 360 has 16 terminal pins 365. Each terminal pin is adapted to engage with and establish an electrical connection to terminal sockets found in the terminal block 212. Various snap-in terminal pins 365, shown in FIG. can be installed in the terminal section 360. For example, the terminal pins can have stems that can be configured to be installed into complementary sockets on terminal section 360. For example, the stems may include ridges that snap into complementary indents in the sockets, or the ridges can be used to make a friction fit with the sidewalls of the sockets. The stems may also be, for example, threaded, whereby the stem is threaded onto complimentary threads located on internal sidewalls of the terminal section socket. The pins 365 are adapted to plug into specific electrical sockets on a front face of the terminal block 212. The terminal section 360 also includes an electrical connector (not shown) that engages a similar connector on the electronics section 355 that passes electrical signals between the terminal pins 365 and the electrical section 355 of the dongle 350.

Figure 4:
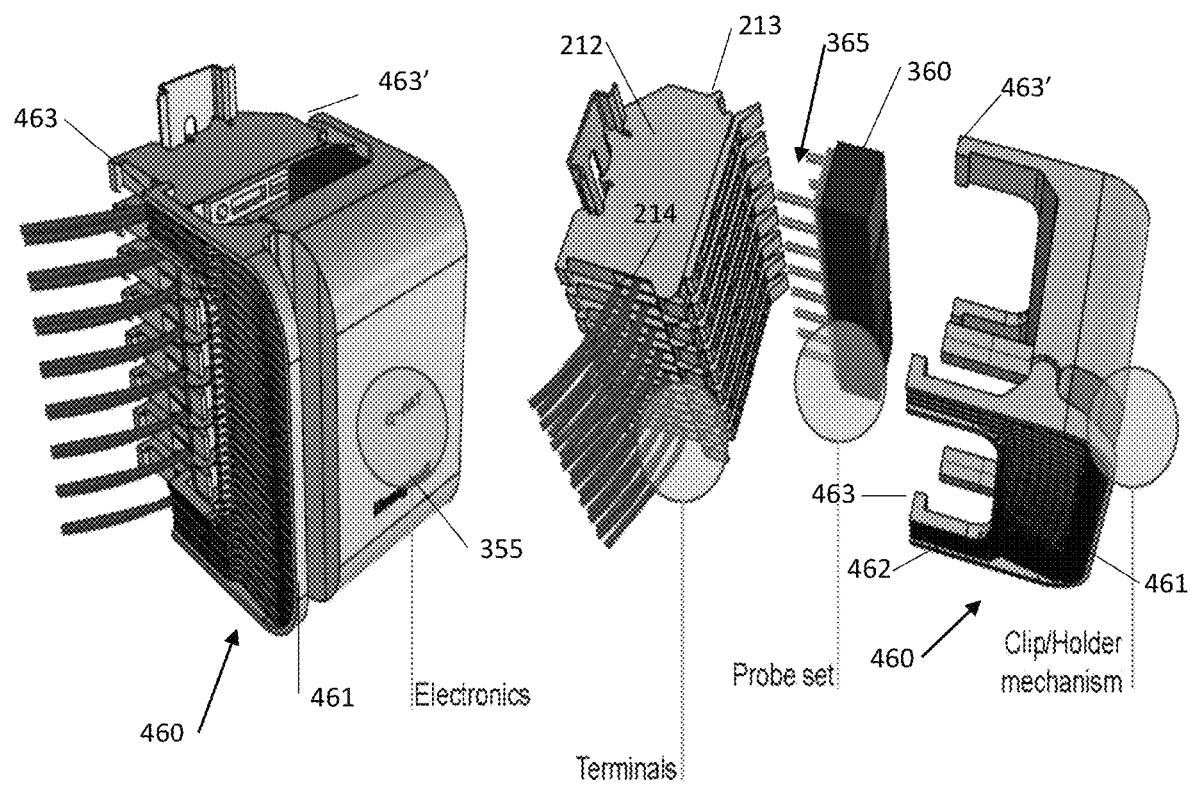
FIG. 4 is an example exploded perspective view of the apparatus of FIG. 3.

As can be best seen at FIG. 4, the dongle 350 also includes a clip/holder mechanism 460 that is used to retain the dongle 350 securely to the terminal block 212. The clip/holder 460 is mounted to the dongle 350 in a manner that allows the clip arm 461 of holder mechanism 460 to be moved latterly away from the terminal block. Applying pressure to arm 461 moves members 462 and hooks 463 latterly away from the terminal block 212. The dongle is installed by inserting pins 365 into complementary electrical sockets in terminal block 212. Attaching hooks 463' to engage edge 213 of terminal block 212. Releasing the clip arm 461 allows hooks 463 to grab edge 214 of terminal block 212 and retain the dongle 350 on the terminal block 212 as is shown in FIG. 4. Lateral movement of the clip/holder can be accomplished, for example, with the use of a spring (not shown) which will allow the lateral movement of the clip arm 461 by physical manipulation or by use of a live hinge that is made from a thinner cross-section of the material making-up the housing of the dongle 350.

Figure 6:
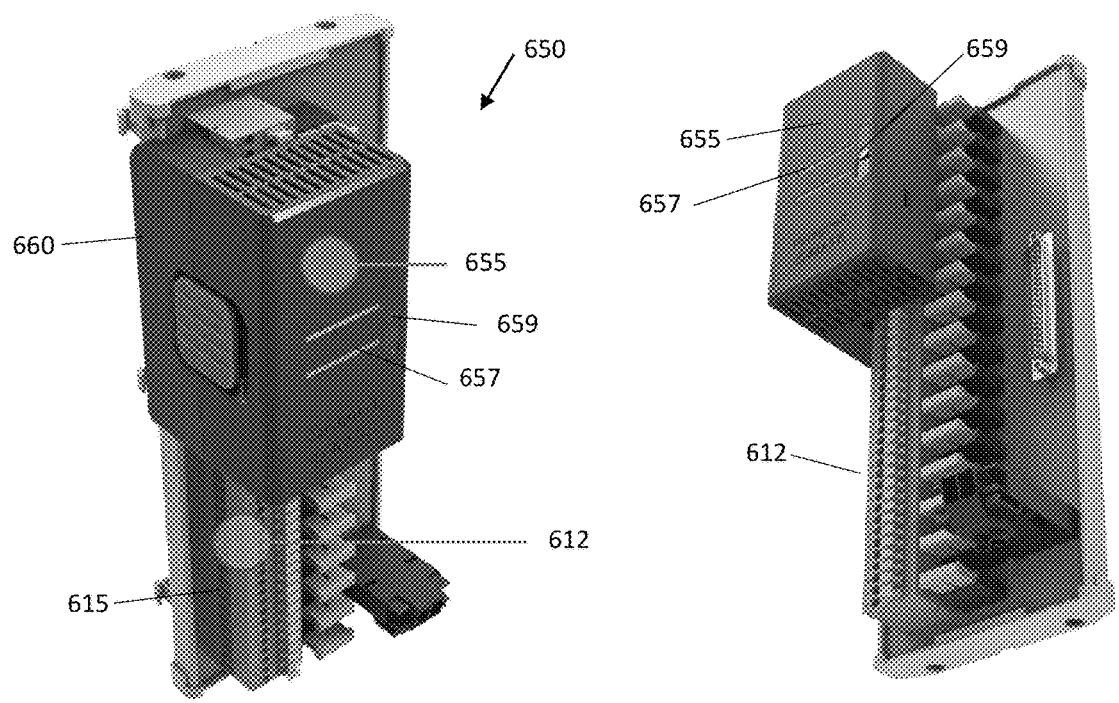
FIG. 6 is an example perspective view of a second embodiment of the apparatus mounted on a terminal block according to this disclosure.
Figure 7:
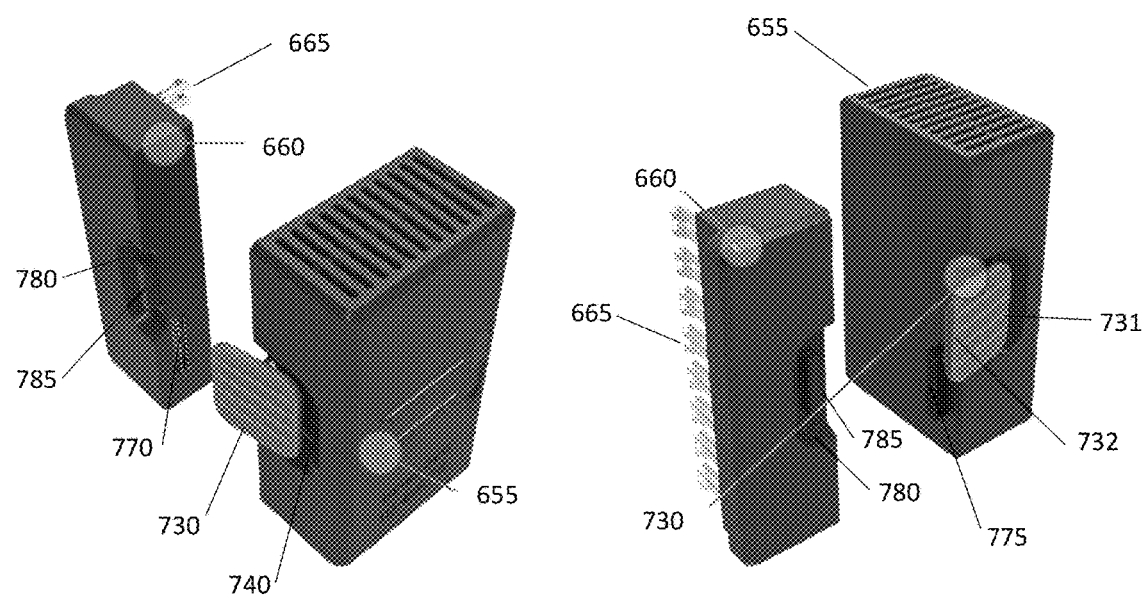
FIG. 7 is example perspective view of the terminal section and electronic section of the apparatus of the second embodiment according to this disclosure.

Turning know to FIG. 6 and FIG. 7, a second embodiment of an apparatus of the disclosure is illustrated. A dongle 650 is comprised of an electronics section 655 and a separate terminal section 660. The electronics section 655 includes the electronic components shown in FIG. 5 and operates within the system of FIG. 2 similarly as described for dongle 350 of FIG. 3. The electronics section 655 of dongle 650 may include a set of indicator lights 657 on a front face of the electronics section. The indicator lights 657 may be used, for example to visually show the operating status of the dongle 650. The electronics section 655 may also have a switch 659 on its front face used to turn the dongle 650 on or off.

The terminal section 660 provides a snap-in arrangement of terminal pins 665. For example, in the terminal section 660 shown in FIG. 6, an 8-channel snap-in terminal section 660 has 16 terminal pins 665. Each terminal pin is adapted to engage with, and establish an electrical connection to, terminal sockets 615 found on a side face of terminal block 612. Terminal blocks such as terminal block 612 include terminal sockets for accepting wires or other forms of electrical connections on a side face 615 of the terminal block 612. The dongle 650 of the second embodiment of the disclosure is configured to use these side terminal sockets 615 to connect the terminal section 660 to terminal block 612. For example, the terminal pins 665 can have stems that can be configured to be installed into complementary sockets on terminal section 660. For example, the stem may include ridges that snap into complementary indents in the sockets, or the ridges can be used to make a friction fit with the sidewalls of the sockets. The stems may also be, for example, threaded, whereby the stem is threaded onto complimentary threads located on internal sidewalls of the terminal section socket.

The terminal section 660 further includes an electrical connector 770, best seen on FIG. 7 that engages a similar connector 775 on electronics section 655. The electrical connectors pass electrical signals between the terminal pins 665 and the I/O unit 508 of electrical section 655.

As can be best seen at FIG. 7, the terminal section 660 is retained on the electronics section 655 using a latch mechanism 730. The latch 730 is mounted in a recessed area 740 on a side face of the electronics section 655. Applying pressure to a back section 731 of latch 730 moves latch outward from the side face of the electronics section, rendering the latch 730 unlatched. The terminal section 660 also has a complementary recessed area 780 on its side face that includes a receiving member 785. With the latch 730 unlatched the terminal section 660 is installed on the electronics section 655 by connecting connector 770 to connector 775 and the latch 730 snapped on receiving member 785 by applying a pressure to a forward section 732 of the latch 730, until the latch 730 engages the member 785. The latch 730 mechanically retains the terminal section 660 to the electrical section 655. As can be best seen in FIG. 6, the dongle 650 is installed onto terminal block 612 by inserting pins 665 into complementary electrical sockets 615.

Figure 8:
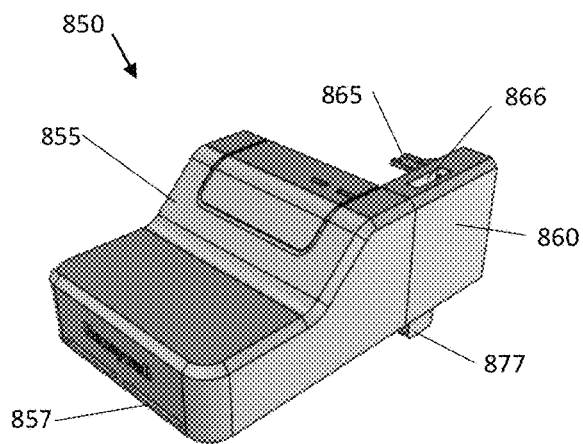
FIG. 8 is an example perspective view of a third embodiment of the apparatus according to this disclosure.
Figure 9:
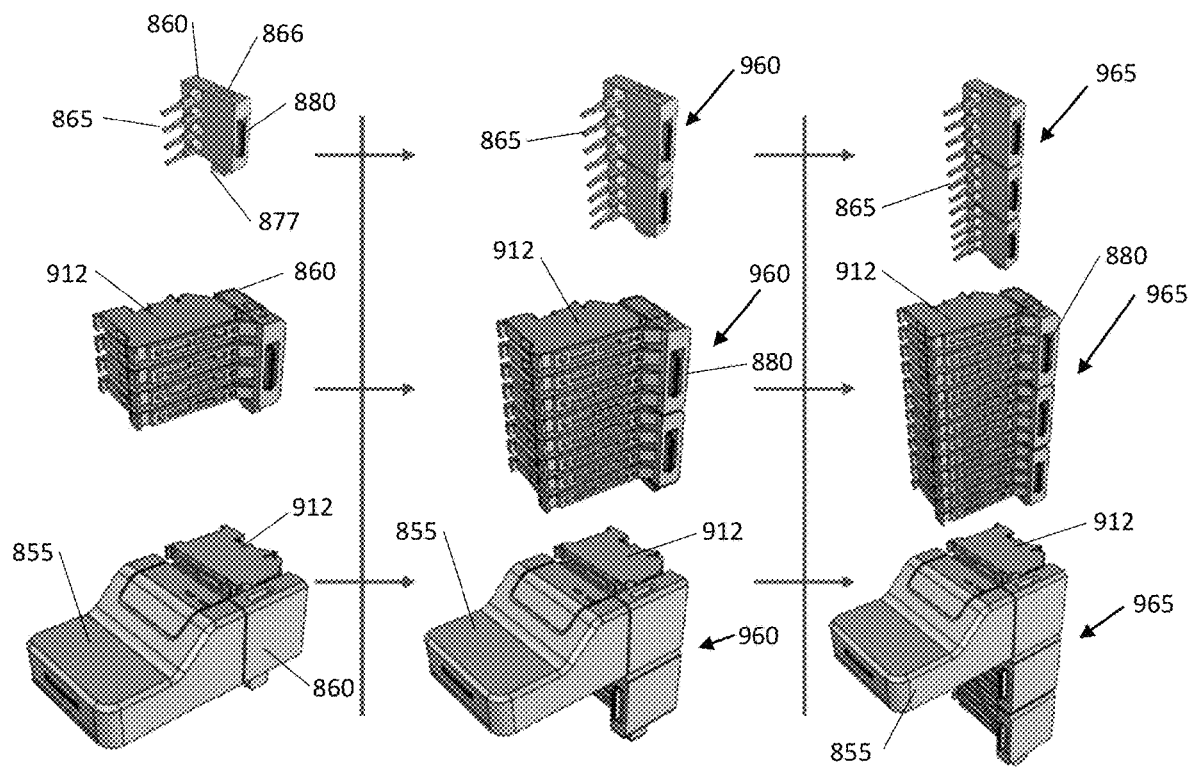
FIG. 9 is an example perspective view of the assembly of the terminal section of FIG. 8 into modular terminal units and their installation on terminal blocks according to this disclosure.

Turning know to FIG. 8 and FIG. 9, a third embodiment of the apparatus of the disclosure is illustrated. Dongle 850 is comprised of an electronics section 855 and a separate modular terminal section 860. The electronics section 855 includes the electronic components shown in FIG. 5 and operates within the system of FIG. 2 similarly as described for dongle 350 of FIG. 3. The electronics section 855 of dongle 850 may include a set of indicator lights, such as indicator light 857 on a front face of the electronics section 855. The indicator light 857 used for example, to show the operating status of the dongle 850.

The terminal section 860 provides a snap-in arrangement of terminal pins 865. For example, in the terminal section 860 shown in FIG. 9, a 2-channel snap-in terminal section 860 has 4 terminal pins 865. Each terminal pin is adapted to engage with and establish an electrical connection to terminal sockets found on a side face of a terminal block 912. Terminal blocks such as terminal block 912 include terminal sockets for accepting wires or other forms of electrical connections on a side face of the terminal block. The dongle 850 of the third embodiment is configured to use these side terminal sockets to connect the terminal section 860 to terminal block 912. For example, the terminal pins 865 can have stems that can be configured to be installed into complementary sockets on terminal section 860. For example, the stem may include ridges that snap into complementary indents in the sockets, or the ridges can be used to make a friction fit with the sidewalls of the sockets. The stems may also be, for example, threaded, whereby the stem is threaded onto complimentary threads located on internal sidewalls of the terminal section 860 sockets.

The terminal section of this third embodiment is configured to be modular allowing multiple terminal sections 860 to be connected together in a stacked configuration. Each modular terminal section 860 includes electrical connectors 866 on a top face of the terminal section and an electrical connector 877 on a bottom face of the terminal section 860. As can be seen in FIG. 9 two modular terminal sections 860 can be plugged together to form a stacked terminal unit 960 or three terminal sections plugged together to form a stacked terminal unit 965. It will be understood by those skilled in this art that multiple modular terminal sections 860 can be connected together in this modular fashion to electrically connect the dongle 850 to multiple terminal blocks 912. Any number of terminal sections 860 can be connected together to form multiple connections to multiple terminal blocks.

Each of the modular terminal sections 860 further includes a third electrical connector 880 on a front face of the modular terminal section. This third electrical connector 880 engages a similar connector (not shown) on the electronics section 855 that passes electrical and communication signals between all of the terminal pins 865 of each of the modular terminal section of unit assemblies 960, 965 and the electrical section 855. After all of the modular sections are installed on the terminal block 912 the electronics section 855 is installed in any one of the modular terminal sections 860 by engaging an electronics section connector (not shown) to the third electrical connector 880 of a single terminal section 860 or to the third electrical connectors 880 of any terminal sections 860 of a stacked terminal unit 960, 965.

Figure 10:
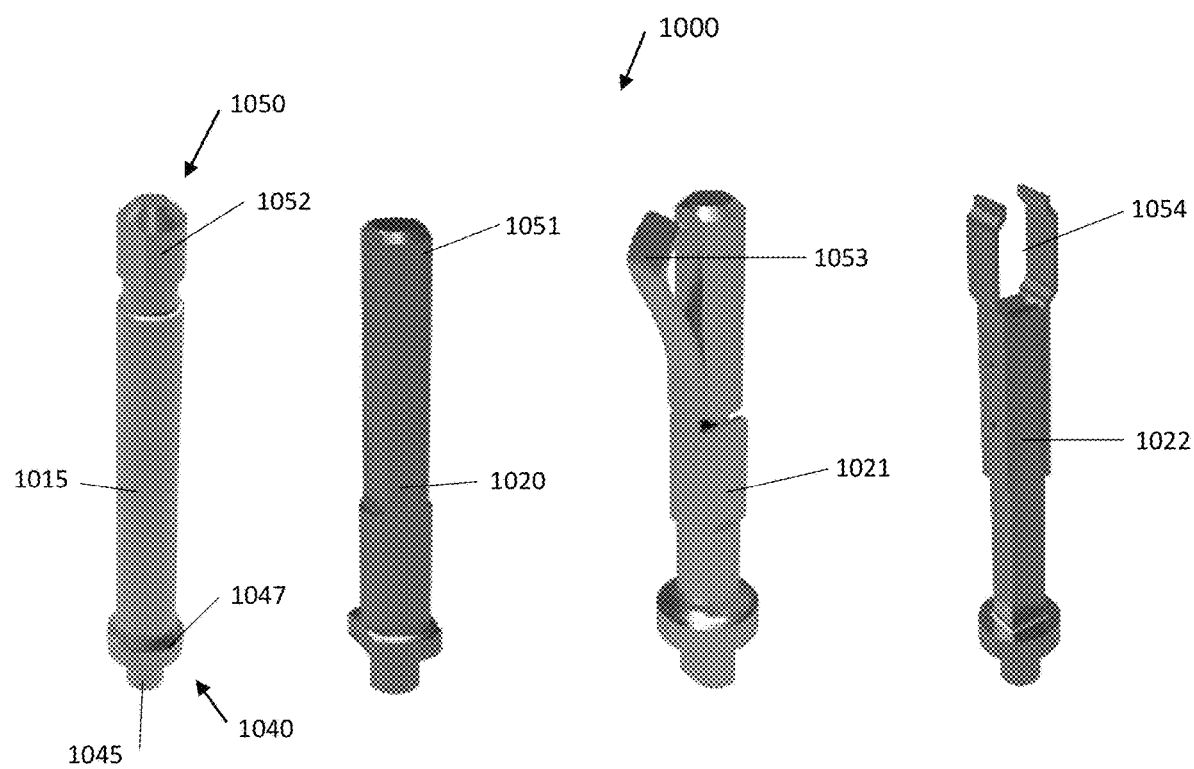
FIG. 10 is an example perspective view of the various electrical terminal pins used in the terminal section of the embodiments according to this disclosure.

FIG. 10 illustrates the interchangeable terminal pins that can be installed on terminal sections 360, 660, 860 of the various embodiments of this disclosure. As can be seen, each of the terminal pins 1000 are configured to have a pin body constructed of a conductive material, for example, from metal, copper or aluminum, or other plated alloys that are good electrical conductors. The pin body may have a cylindrical shape such as pin body 1015 or rectangular shape such as pin bodies 1020, 1021, 1022. Each of the pin bodies extend longitudinally between a base portion and a head portion, such as base portion 1040 and head portion 1050 of pin body 1015.

For ease of explanation, only the connection structures of pin body 1015 will be explained. However, it will be understood that the base portions of the other pin bodies 1020, 1021 and 1022 have the same structures and function in the same manner as the base portion of pin body 1015.

The base portion 1040 includes a stem 1045 and a ridge 1047. The stem 1045 is configured to be accepted into an electrical socket located on the terminal section 360, 660 and 860 of dongles 350, 650 and 860, respectively. The ridge 1047 defines the outer most limit of insertion of the stem 1045 into a terminal section electrical socket, thereby preventing the pin body 1015 from being inserted any farther into the socket. The stem 1045 is configured to make an electrical, as well as, a mechanical connection with the terminal section electrical socket. For example, the stem may include ridges that snap into complementary indents in the sockets, or the ridges can be used to make a friction fit with the sidewalls of the sockets. The stems may also be, for example, threaded, whereby the stem is threaded onto complimentary threads located on internal sidewalls of the terminal section electrical sockets.

On the head end 1050 of each the pin bodies 1015, 1020, 1021 and 1022 various connective structures can be formed that are adapted to be inserted into complementary terminal sockets of various terminal blocks. Pin body 1020 for example, includes a straight pin structure 1051, pin body 1015 has a squared-off contact portions having flat contact surfaces 1052. Pin body 1021 includes a single wiper contact 1053 and pin body 1022 a bi-furcated wiper structure 1054. As will be understood by those skilled in the art, any form of contact structure can be formed on the head end 1050 of each pin body that can effectively make a good electrical contact with the terminal sockets of the terminal blocks where the various dongles of this disclosure are installed.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals A non-transitory computer readable medium includes media where data can be permanently stored and media where data can be stored and later overwritten, such as a rewritable optical disc or an erasable memory device.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus configured to be installed on a terminal block and to make an electrical connection to at least one I/O loop, the apparatus comprising:
    a terminal section having an electrical connector and at least one pair of electrical terminals, the electrical terminals arranged to be connected to the terminal block and to the at least one I/O loop;
    an electronic section having an electrical connector connected to the terminal section connector arranged to communicate with the I/O loop through the terminal section, wherein the electronic section includes:
        a wireless communication unit configured to receive an I/O loop check file from operating software located at a remote location, and
        a processor configured to execute the I/O loop check file, testing the at least one I/O loop by applying test signals through the at least one pair of terminal pins connected to the terminal block; and
    a latching arm configured to be manually operated to retain the apparatus to the terminal block.

2. The apparatus of claim 1, wherein the electronic section further includes:
    an I/O unit configurable to drive signals to simulate the specific I/O type of the I/O loop being tested; and
    the test signals are applied to the at least one pair of terminal pins according to the I/O type.

3. The apparatus of claim 1, wherein the latching arm is configured to be manually operated to unlatch and separate the apparatus from the terminal block.

4. The apparatus of claim 1, wherein the terminal block further includes:
    a plurality of terminal sockets connected to a plurality of I/O loops; and
    the terminal section includes a plurality of electrical terminals arranged to be connected to the plurality of terminal sockets of the terminal block and to the plurality of I/O loops.

5. The apparatus of claim 4, wherein the terminal block further includes a variety of specific terminal socket configurations and each terminal section includes a plurality of electrical sockets, each terminal socket configured to receive and install therein a specific electrical terminal adapted to be used with a specific terminal socket configuration.

6. An apparatus configured to be installed on a terminal block and to make an electrical connection to at least one I/O loop, the apparatus comprising:
    a terminal section having an electrical connector and at least one pair of electrical terminals, the electrical terminals arranged to be connected to the terminal block and to the at least one I/O loop;
    an electronic section having an electrical connector connected to the terminal section connector arranged to communicate with the I/O loop through the terminal section, wherein the electronic section includes:
        a wireless communication unit configured to receive an I/O loop check file from operating software located at a remote location, and
        a processor configured to execute the I/O loop check file, testing the at least one I/O loop by applying test signals through the at least one pair of terminal pins connected to the terminal block; and
    a latch configured to be manually operated to retain the terminal section to the electronic section.

7. The apparatus of claim 6, wherein the electronic section further includes:
    an I/O unit configurable to drive signals to simulate the specific I/O type of the I/O loop being tested; and
    the test signals are applied to the at least one pair of terminal pins according to the I/O type.

8. The apparatus of claim 6, wherein the latch is configured to be manually operated to unlatch and separate the terminal section from the electronic section.

9. The apparatus of claim 6, wherein the terminal block further includes:
    a plurality of terminal sockets connected to a plurality of I/O loops; and
    the terminal section includes a plurality of electrical terminals arranged to be connected to the plurality of terminal sockets of the terminal block and to the plurality of I/O loops.

10. The apparatus of claim 9, wherein the terminal block further includes a variety of specific terminal socket configurations and each terminal section includes a plurality of electrical sockets, each terminal socket configured to receive and install therein a specific electrical terminal adapted to be used with a specific terminal socket configuration.

11. An apparatus configured to be installed on a terminal block and to make an electrical connection to at least one I/O loop, the apparatus comprising:
    a terminal section having at least one pair of electrical terminals, the electrical terminals arranged to be connected to the terminal block and to the at least one I/O loop; and
    an electronic section electrically connected to the terminal section adapted to communicate with the I/O loop through the terminal section, wherein the electronic section includes:
        a wireless communication unit configured to receive an I/O loop check file from operating software located at a remote location, and
        a processor configured to execute the I/O loop check file, testing the at least one I/O loop by applying test signals through the at least one pair of terminal pins connected to the terminal block.

12. The apparatus of claim 11, wherein the electronic section further includes:
   an I/O unit configurable to drive signals to simulate the specific I/O type of the I/O loop being tested; and
   the test signals are applied to the at least one pair of terminal pins according to the I/O type.

13. The apparatus of claim 11, wherein the terminal block further includes:
   a plurality of terminal sockets connected to a plurality of I/O loops; and
   the terminal section includes a plurality of electrical terminals arranged to be connected to the plurality of terminal sockets of the terminal block and to the plurality of I/O loops.

14. The apparatus of claim 13, wherein each terminal section is a modular terminal unit with each modular terminal unit including first and second electrical connectors that connect to and retain one modular terminal unit to another modular terminal unit to form a stack of modular terminal units, each modular terminal unit including a plurality of electrical terminals arranged to be connected to the plurality of terminal sockets of the terminal block and to the plurality of I/O loops.

15. The apparatus of claim 14, wherein the electronic section further includes an electrical connector and each modular terminal unit further includes a third electrical connector, the third electrical connector arranged to receive and connect to the electronic section connector, connecting the electronic section to the stack of modular terminal units, the electronic section communicating with the plurality of I/O loops through the stack of modular terminal units.

16. The apparatus of claim 13, wherein the terminal block further includes a variety of specific terminal socket configurations and each terminal section includes a plurality of electrical sockets, each terminal socket configured to receive and install therein a specific electrical terminal adapted to be used with a specific terminal socket configuration.

17. The apparatus of claim 11, wherein the terminal block is located in a marshalling cabinet, a field termination assembly or a junction box.

* * * * *